(12) United States Patent
Lhomme

(10) Patent No.: US 7,003,133 B2
(45) Date of Patent: Feb. 21, 2006

(54) VIDEO CODING STATION FOR INSTALLATION AUTOMATICALLY SORTING POSTAL OBJECTS

(75) Inventor: Christophe Lhomme, Paris (FR)

(73) Assignee: SOLYSTIC, Gentilly Cedex (FR)

( * ) Notice: Subject to any disclaimer, the term of this patent is extended or adjusted under 35 U.S.C. 154(b) by 667 days.

(21) Appl. No.: 10/239,780

(22) PCT Filed: Jun. 19, 2001

(86) PCT No.: PCT/FR01/01901

§ 371 (c)(1),
(2), (4) Date: Sep. 25, 2002

(87) PCT Pub. No.: WO01/97986

PCT Pub. Date: Dec. 27, 2001

(65) Prior Publication Data

US 2003/0047494 A1    Mar. 13, 2003

(30) Foreign Application Priority Data

Jun. 20, 2000 (FR) .................................. 00 07850

(51) Int. Cl.
G06K 9/00 (2006.01)

(52) U.S. Cl. ............... 382/101; 209/900; 705/401
(58) Field of Classification Search ............... 382/100, 382/101, 102; 209/584, 900; 705/401, 406, 705/407; 358/402, 427.07, 479, 539; 380/200, 380/246

See application file for complete search history.

(56) References Cited

U.S. PATENT DOCUMENTS

| 5,292,004 A | * | 3/1994 | Cesarini ...................... 209/3.1 |
| 5,998,753 A | * | 12/1999 | Darchis et al. ............. 209/584 |
| 6,292,709 B1 | * | 9/2001 | Uhl et al. ................... 700/226 |
| 6,741,724 B1 | * | 5/2004 | Bruce et al. ................ 382/101 |
| 6,909,789 B1 | * | 6/2005 | Hansel et al. ............... 382/101 |

FOREIGN PATENT DOCUMENTS

| DE | 196 46 522 A1 | 5/1998 |
| EP | 0 436 884 A2 | 7/1991 |
| EP | 0 589 119 A1 | 3/1994 |
| FR | 2 591 512 | 6/1987 |

* cited by examiner

*Primary Examiner*—Kanjibhai Patel
*Assistant Examiner*—Abolfazl Tabatabai
(74) *Attorney, Agent, or Firm*—Sughrue Mion, PLLC

(57) ABSTRACT

The video-coding station for an installation for sorting postal items, in particular packets, steering each packet towards a sorting outlet on the basis of an automatic reading of a postal address (AD) of the packet in a digitized image of the packet, includes a central processor unit, a screen (EC), and a keyboard (CL), and is programmed so as to display an image (IP) so that a video-coding operator (OV) can perform semi-automatic processing of the reading of the address (AD). The station further includes a pointing device (JS) for positioning a reticule (RE) on the center of a zone of the image displayed, and a trigger button (BT) for recording the current position of the reticule so that the operator can rapidly identify the location of the postal address (AD). Such a video-coding station enables an operator to identify rapidly a zone of interest including the postal address, so that the postal address corresponding to the packet can be identified by applying an automatic character-recognition algorithm to the zone of interest.

2 Claims, 3 Drawing Sheets

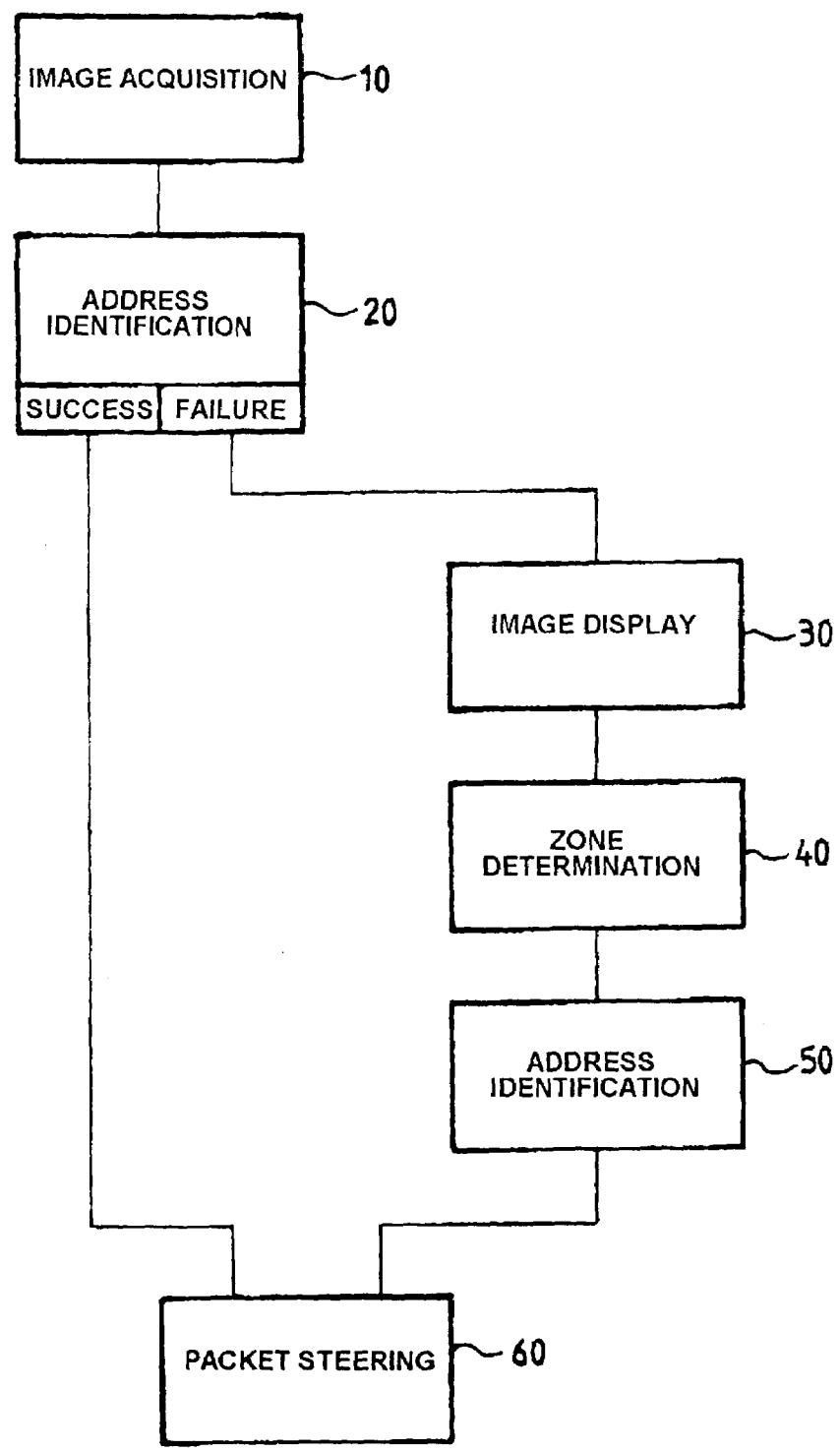
FIG_1

FIG_2
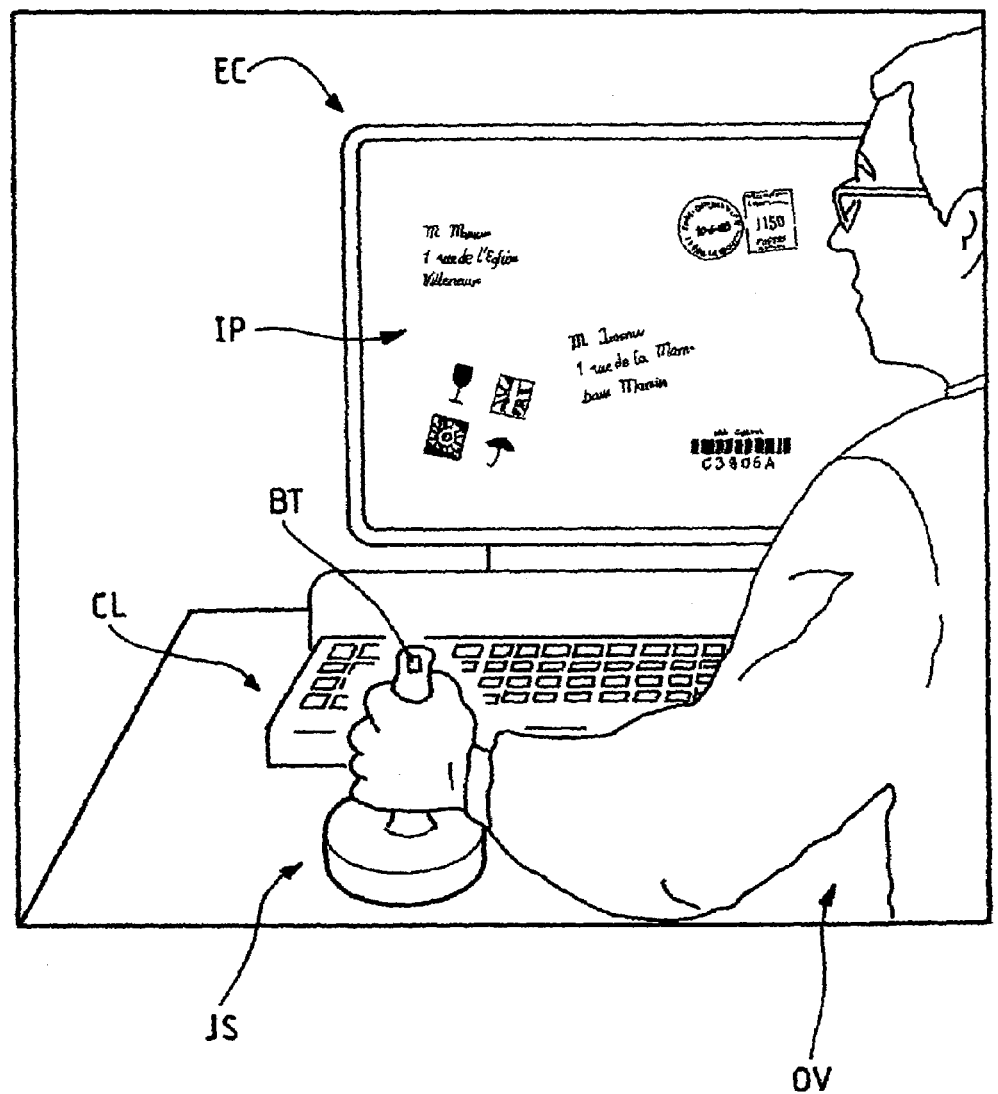

FIG_3
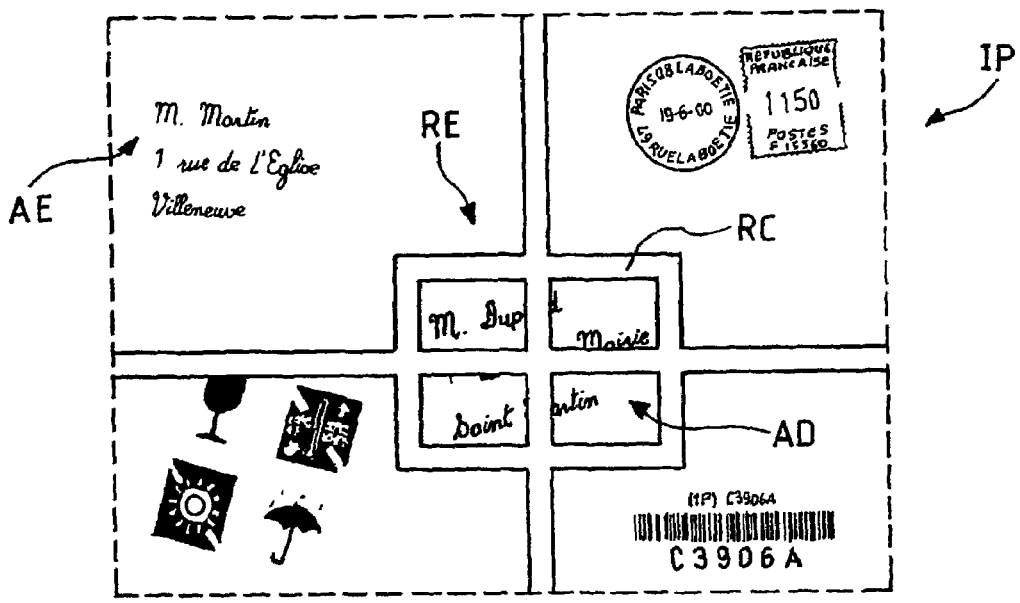
FIG_4
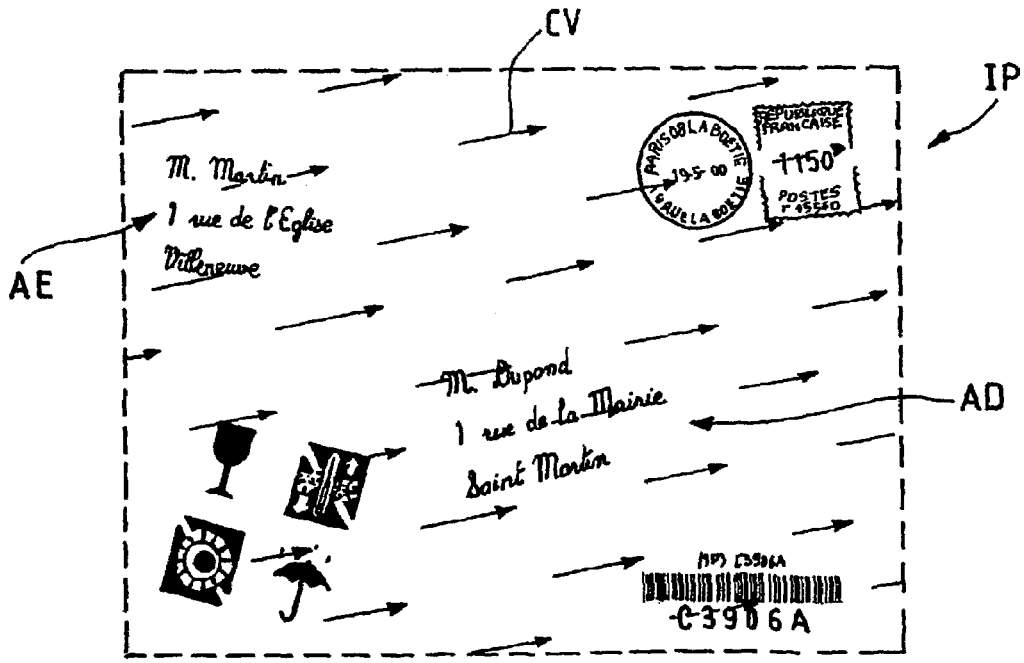

VIDEO CODING STATION FOR INSTALLATION AUTOMATICALLY SORTING POSTAL OBJECTS

BACKGROUND OF THE INVENTION

The invention relates to automatically processing mail, and more particularly, to automatically processing postal packets in a process for automatically sorting postal packets.

A process for automatically sorting postal items of the letter type is conventionally carried out by conveying each letter edgewise so as to make it pass in front of a camera in such a manner as to pick up a digitized image of the letter, which image can subsequently be binarized and filtered so as to carry out automatic postal address recognition on the image. In general, in mail of that type, the postal address is disposed parallel to the foot of the letter or perpendicular to said foot, i.e. parallel to one of the edges of the image, so that an automatic character-recognition algorithm can be applied directly to a rectangular portion of the digitized image.

Postal items of the packet type are generally voluminous items which are conveyed flat on a belt. With conveying of this type and postal items of this type, it is not always possible to apply an automatic character-recognition algorithm directly to the packet image picked up by a camera due to the facts that the items are generally covered in logos, stickers and other inscriptions, and that there is no reliable way of automatically detecting in the image of a postal packet which zone of the image contains the relevant postal address. In addition, on this type of postal item, the postal address which should be read automatically from the image of the item is generally in a position which varies greatly from one postal item to another. In automatic mail sorting installations, a video-coding station is often provided for enabling a postal address to be read in a semi-automatic manner if it has not been possible to read said postal address by automatic character-recognition.

Such a video-coding station generally comprises a central processor unit for holding a digitized image of a postal item in memory, a screen connected to the central processor unit for displaying said image of a postal item in such a manner as to enable an operator to see a postal address of the postal item in the image, and a keyboard connected to the central processor unit to enable the operator to key in the postal address of the item so as to be able to steer said item automatically towards a corresponding sorting outlet of the postal sorting installation.

SUMMARY OF THE INVENTION

The object of the invention is to improve such a video-coding station so as to enable images of postal packets to be processed easily.

To this end, the invention provides a video-coding station for an installation for automatically processing postal items, in particular packets, the station comprising a central processor unit for holding a digitized image of a postal item in memory, a screen connected to the central processor unit for displaying said image of a postal item in such a manner as to enable an operator to see a postal address of the postal item in the image, and a keyboard connected to the central processor unit to enable the operator to key in the postal address of the item, the station being characterized in that it further comprises a pointing device linked to the central processor unit and capable of moving a reticule of rectangular shape over the image of the item displayed on the screen in such a manner as to enable the operator to circumscribe the postal address within the reticule by maneuvering said pointing device, and in that the central processor unit is programmed to display, in response to a command entered via the keyboard, a field of vectors on said image of the item and to orientate said field of vectors in the plane of the image in response to a maneuver of the pointing device in order to align the field of vectors with the lines in the postal address.

With such a video-coding station, the video-coding operator can easily use the reticule to outline the zone of the image of a postal packet that contains a postal address, and can use the orientation of the field of vectors to input the forward direction of the lines of the postal address in such a manner as to enable an automatic character-recognition algorithm to be applied subsequently to said image zone.

In a preferred embodiment of the video-coding station of the invention, the central processor unit is programmed so as to increase or reduce the dimensions of the rectangular reticule in response to a command entered via the pointing device, thereby making it possible to adjust the size of the zone of the image to which the automatic character-recognition algorithm is to be applied.

BRIEF DESCRIPTION OF THE DRAWINGS

An embodiment of the video-coding station of the invention is described below in more detail, and shown in the accompanying drawings.

FIG. 1 is a flow chart showing various processing steps in an installation for sorting postal items.

FIG. 2 is a diagram showing a video-coding station.

FIG. 3 is a diagram showing a zone of interest being identified by the video-coding station of the invention.

FIG. 4 is a diagram showing an orientation of the destination address being identified by the video-coding station of the invention.

DETAILED DESCRIPTION OF THE INVENTION

FIG. 1 is a very diagrammatic flow chart showing part of a process for sorting postal packets, said process comprising steps of processing digitized images of packets in order to enable a postal address to be read automatically on each postal packet, which address serves in the sorting process to direct the packet in question automatically to a corresponding sorting outlet.

At 10, a packet conveyed flat on a conveyor belt passes under a camera which picks up a digitized image IP of the packet. In general, such a digitized image is subjected to operations such as binarization, and the elimination of isolated black pixels, such operations being intended to reduce the size of the computer file corresponding to the digitized image.

At 20, an automatic character-recognition algorithm is applied to the digitized image IP in order to identify, in said image, the destination address of the corresponding postal packet. More particularly, such an algorithm generally reduces the image IP to one or more zones of interest, and subsequently extracts character strings from said zones of interest before analyzing said character strings by comparing them with a database, for example, in order to identify the destination address of the postal packet. In general, postal packets include a large amount of information, so much so that such an algorithm frequently fails due to the fact that it does not manage to detect, in the digitized image IP of the packet, the zone of interest containing the destination address. Thus, the outcome of step 20 can be successful if the automatic identification of the destination address succeeds, in which case the postal packet is directed at 60 to the sorting outlet corresponding to the identified destination address, or it can fail if the destination address could not be identified, in which case the digitized image IP of the packet is transmitted at 30 to the video-coding station of the invention so that a video-coding operator can identify the zone of interest containing the destination address in the digitized image IP of the packet.

At 30, the image IP of the postal packet is transmitted and then displayed on the screen of the video-coding station. With reference to FIG. 2, in which a video-coding station of the invention is shown diagrammatically, an operator OV can be seen installed in front of a video-coding station of the invention. The station, which can be a computer, comprises a screen EC on which the image IP is displayed, a keyboard CL, and a pointing device JS which is a steerable control stick of the "joystick" type, including, in particular, a trigger button BT.

At 40, the video-coding operator identifies the location and the orientation of the postal address in the digitized image IP of the packet. With reference to FIG. 3, in which the location of the postal address is shown diagrammatically, the image IP can be seen such as it is displayed on the screen of the video-coding station. Among other things, the image comprises a destination address AD and a sender address AE, as well as various logos and stickers. In order to locate the destination address, the video-coding operator makes a reticule RE appear by pressing one of the buttons on the control stick JS or a function key on the keyboard CL, then positions the reticule RE on the center of the destination address, by maneuvering the control stick JS in such a manner that the rectangle RC of the reticule RE surrounds the said address, before confirming the choice by pressing the trigger button BT of the control stick JS. More particularly, the video-coding station, which is interconnected with the control stick JS, is programmed so that by manipulating the control stick JS, the reticule RE can be moved over the image in such a manner as to position the reticule over the center of the zone that is to be localized. In a variant, a command that is accessible from the control stick JS or from the keyboard makes it possible to adjust the size of the rectangle RC so that said rectangle surrounds the entire address AD.

Once the address AD has been located, the operator activates the orientation function by pressing a button on the control stick JS or a key on the keyboard CL, so as to define the orientation and the direction of the lines of the address AD. With reference to FIG. 4, which diagrammatically shows the identification of the orientation of the lines of the address AD, it can be seen that the video-coding station displays a field of vectors CV on the image of the packet IP. More particularly, the video-coding station of the invention is programmed so that by acting on the control stick JS, the operator turns the field of vectors CV in such a manner as to make the field of vectors correspond with the forward direction in which the postal address AD is written. Thus, the zone of interest that has been completely identified by the video-coding operator is subsequently submitted at 50 to an automatic character-recognition algorithm which identifies the destination address AD, taking account of the fact that the address is written in the zone of interest in the direction defined by the video-coding operator.

At 60, the packet is steered towards a sorting outlet corresponding to the destination address which has been identified either at 20 or at 50.

Thus, the video-coding station of the invention is particularly intended for sorting voluminous postal items for which said station makes it possible to carry out semi-automatic processing in a very short time due to the fact that it minimizes the amount of handling by the video-coding operator due to the use of a steerable control stick.

What is claimed is:

1. A video-coding station for an installation for automatically processing postal items, in particular packets, the station comprising a central processor unit for holding a digitized image of a postal item in memory, a screen (EC) connected to the central processor unit for displaying said image of a postal item in such a manner as to enable an operator to see a postal address of the postal item in the image, and a keyboard connected to the central processor unit to enable the operator to key in the postal address of the item, wherein said station further comprises a pointing device (JS) linked to the central processor unit and capable of moving a reticule (RE) of rectangular shape (RC) over the image of the item displayed on the screen in such a manner as to enable the operator to circumscribe the postal address within the reticule by maneuvering said pointing device, and in that the central processor unit is programmed to display, in response to a command entered via the keyboard, a field of vectors on said image of the item and to orientate said field of vectors in the plane of the image in response to a maneuver of the pointing device in order to align the field of vectors with the lines in the postal address.

2. The station according to claim 1, in which the central processor unit is programmed so as to increase or reduce the dimensions of the rectangular reticule (RC) in response to a command entered via the pointing device.

* * * * *